United States Patent
Lee et al.

(10) Patent No.: US 11,120,714 B2
(45) Date of Patent: Sep. 14, 2021

(54) CIRCUIT FOR DETECTING CRACK IN DISPLAY AND ELECTRONIC DEVICE INCLUDING SAME

(71) Applicant: Samsung Electronics Co., Ltd., Gyeonggi-do (KR)

(72) Inventors: Seung Jae Lee, Gyeonggi-do (KR); Su Yeon Kim, Gyeonggi-do (KR); Young Man Lee, Seoul (KR); Woon Bo Yeo, Gyeonggi-do (KR); Nam Hyeon Jeon, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/489,608

(22) PCT Filed: Mar. 27, 2018

(86) PCT No.: PCT/KR2018/003595
§ 371 (c)(1),
(2) Date: Aug. 28, 2019

(87) PCT Pub. No.: WO2018/182285
PCT Pub. Date: Oct. 4, 2018

(65) Prior Publication Data
US 2019/0392743 A1 Dec. 26, 2019

(30) Foreign Application Priority Data
Mar. 28, 2017 (KR) .................. 10-2017-0039065

(51) Int. Cl.
*G09G 3/00* (2006.01)
*G09G 5/10* (2006.01)
*G09G 3/3225* (2016.01)

(52) U.S. Cl.
CPC .............. *G09G 3/006* (2013.01); *G09G 5/10* (2013.01); *G09G 3/3225* (2013.01);
(Continued)

(58) Field of Classification Search
CPC ........ G09G 3/006; G09G 3/3225; G09G 5/10; G09G 2330/12; G09G 2354/00;
(Continued)

(56) References Cited

U.S. PATENT DOCUMENTS 9,581,841 B2  2/2017  Yanagisawa
9,747,825 B2  8/2017  Kim
(Continued)

FOREIGN PATENT DOCUMENTS

KR  1020120023378  3/2012
KR  1020140145444  12/2014
(Continued)

OTHER PUBLICATIONS

PCT/ISA/210 Search Report issued on PCT/KR2018/003595, pp. 5.
(Continued)

*Primary Examiner* — Christopher E Leiby
(74) *Attorney, Agent, or Firm* — The Farrell Law Firm, P.C.

(57) ABSTRACT

An electronic device disclosed herein includes a cover glass, a display panel exposed through the cover glass, a flexible substrate extending from a periphery of the display panel and bent and positioned on a rear surface of the display panel, a display driver integrated circuit (DDI) disposed on the flexible substrate, a sensing circuit disposed on the flexible substrate and electrically connected with the display driver integrated circuit, signal lines that transmit a signal to sub-pixels arranged on the display panel, and a sensing line passing through a peripheral portion of the display panel and the flexible substrate and electrically connected with at least some of the signal lines through the sensing circuit.

16 Claims, 8 Drawing Sheets

(52) U.S. Cl.
CPC ..... *G09G 2330/12* (2013.01); *G09G 2354/00* (2013.01); *G09G 2380/02* (2013.01)

(58) Field of Classification Search
CPC .......... G09G 2380/02; G02F 1/133305; G02F 1/1309; H01L 51/0031; H01L 51/0097; H01L 27/3276; H01L 27/3225; H01L 2251/5338
See application file for complete search history.

(56) References Cited

U.S. PATENT DOCUMENTS

| | | | |
|---|---|---|---|
| 9,773,853 | B2 | 9/2017 | Tao et al. |
| 9,837,006 | B2 | 12/2017 | Hwang et al. |
| 9,875,676 | B2 | 1/2018 | Byun et al. |
| 10,102,785 | B2 | 10/2018 | Kim |
| 2014/0176844 | A1 | 6/2014 | Yanagisawa |
| 2014/0300649 | A1* | 10/2014 | Park ............ G09G 3/3208 345/690 |
| 2014/0368228 | A1* | 12/2014 | Kim .............. H01L 51/0097 324/750.3 |
| 2016/0189581 | A1 | 6/2016 | Hwang et al. |
| 2016/0293884 | A1* | 10/2016 | Zhang ............. H05B 45/60 |
| 2016/0372017 | A1 | 12/2016 | Byun et al. |
| 2017/0352302 | A1 | 12/2017 | Kim |
| 2018/0053466 | A1* | 2/2018 | Zhang ............. G01L 1/2281 |

FOREIGN PATENT DOCUMENTS

| | | |
|---|---|---|
| KR | 1020160019954 | 2/2016 |
| KR | 1020160083602 | 7/2016 |
| KR | 1020160148834 | 12/2016 |
| WO | WO 2016/111895 | 7/2016 |

OTHER PUBLICATIONS

PCT/ISA/237 Written Opinion issued on PCT/KR2018/003595, pp. 9.
European Search Report dated Jan. 31, 2020 issued in counterpart application No. 18774363.8-1210, 8 pages.

* cited by examiner

CIRCUIT FOR DETECTING CRACK IN DISPLAY AND ELECTRONIC DEVICE INCLUDING SAME

PRIORITY

This application is a National Phase Entry of PCT International Application No. PCT/KR2018/003595 which was filed on Mar. 27, 2018, and claims priority to Korean Patent Application No. 10-2017-0039065, which was filed on Mar. 28, 2017, the content of each of which is incorporated herein by reference.

TECHNICAL FIELD

Embodiments of the present disclosure disclosed herein relate to a technology for sensing cracks in a display panel.

BACKGROUND ART

Electronic devices equipped with a display, such as smartphones, wearable devices, and the like, have been widely used with the development of mobile communication technologies. These electronic devices may execute various functions, such as taking a photo or a moving picture, reproducing a music file or a video file, a game, the Internet, and the like, through the display.

To execute the aforementioned functions, very sophisticated technologies are applied to the display. For example, a sensor for sensing a user input, a circuit for outputting an image, and the like may be mounted in the display.

The above information is presented as background information only to assist with an understanding of the present disclosure. No determination has been made, and no assertion is made, as to whether any of the above might be applicable as prior art with regard to the present disclosure.

DISCLOSURE

Technical Problem

Defects (e.g., cracks) in a display may cause malfunction of or fatal damage to an electronic device. The display may include a circuit disposed in a bezel area and capable of sensing the defects. For example, when the bezel area has cracks, the circuit may output, through a display panel, an indication (e.g., a vertical line) that shows that the bezel area cracked.

However, since the bezel area is very narrow, it may not be easy to implement the circuit in the bezel area. Especially, since corners of the bezel area are narrower, it may be even more difficult to implement the circuit in the corners of the bezel area.

Meanwhile, a user cannot find out the position of cracks even though the circuit outputs the indication through the display panel. For example, the user cannot find out whether the bezel area or a flexible substrate has cracks.

Aspects of the present disclosure are to address at least the above-mentioned problems and/or disadvantages and to provide at least the advantages described below. Accordingly, an aspect of the present disclosure is to provide an electronic device for solving the above-mentioned problems and disadvantages.

Technical Solution

In accordance with an aspect of the present disclosure, an electronic device includes a cover glass, a display panel exposed through the cover glass, a flexible substrate extending from a periphery of the display panel and bent and positioned on a rear surface of the display panel, a display driver integrated circuit (DDI) disposed on the flexible substrate, a sensing circuit disposed on the flexible substrate and electrically connected with the display driver integrated circuit, signal lines that transmit a signal to sub-pixels arranged on the display panel, and a sensing line passing through a peripheral portion of the display panel and the flexible substrate and electrically connected with at least some of the signal lines through the sensing circuit. The display driver integrated circuit is configured to display an electrical signal received through the sensing line on the display panel through some of the signal lines to allow identification of a defect in a display.

In accordance with another aspect of the present disclosure, a display module includes a display panel including an active area in which one or more pixels are arranged and an inactive area in which a sensing line connected with at least some of the pixels is arranged, a flexible substrate connected with the display panel and on which at least a portion of the sensing line is formed, and a sensing circuit disposed on at least a partial area of the flexible substrate and sensing cracks in the display panel by using at least a portion of the sensing line. At least a partial area of the flexible substrate is bent to face a rear surface of the display panel.

Advantageous Effects

According to embodiments of the present disclosure, it is possible to reduce the width of a bezel. Furthermore, according to embodiments of the present disclosure, it is possible to find the position of cracks.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1A:
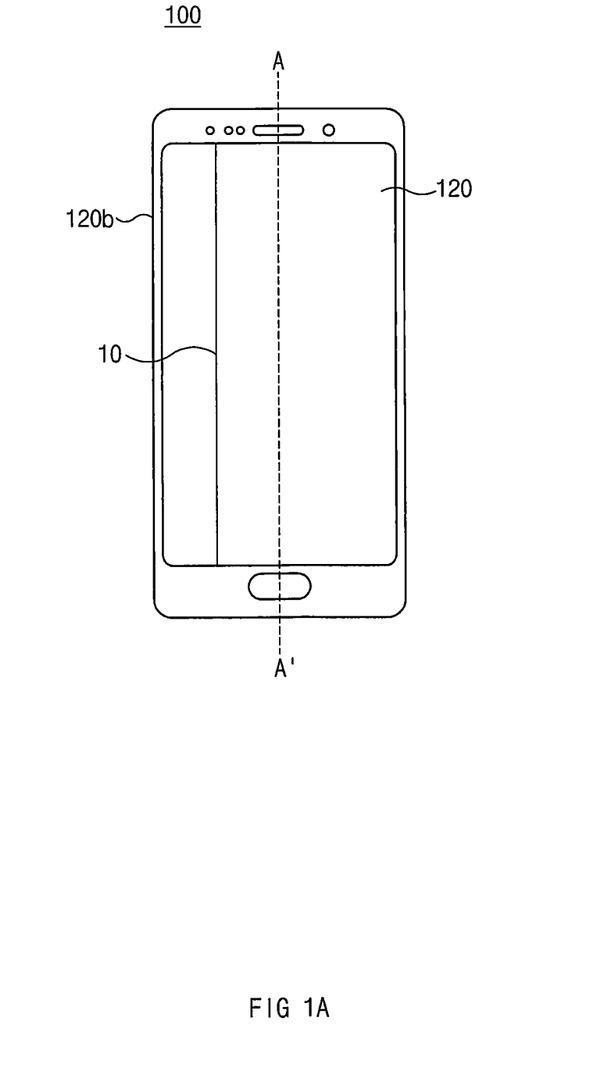
FIG. 1A illustrates a top view of an electronic device according to an embodiment.

FIG. 1A illustrates a top view of an electronic device according to an embodiment.

Referring to FIG. 1A, an electronic device 100 may output an image through a display panel 120. For example, the electronic device 100 may output a photo, a video, or the like through the display panel 120 in response to a user input (e.g., a touch on a cover glass 110 of FIG. 1B).

According to an embodiment, in a sensing mode, the electronic device 100 may output whether the display panel 120 has a defect (e.g., cracks). For example, the electronic device 100 may output a vertical line 10 on the display panel 120 when a bezel area 120b has cracks. In contrast, the electronic device 100 may not output the vertical line 10 when the display panel 120 has no crack.

In this disclosure, the sensing mode may refer to a state in which the electronic device 100 performs a function of sensing whether the display panel 120 is defective or not.

Figure 1B:
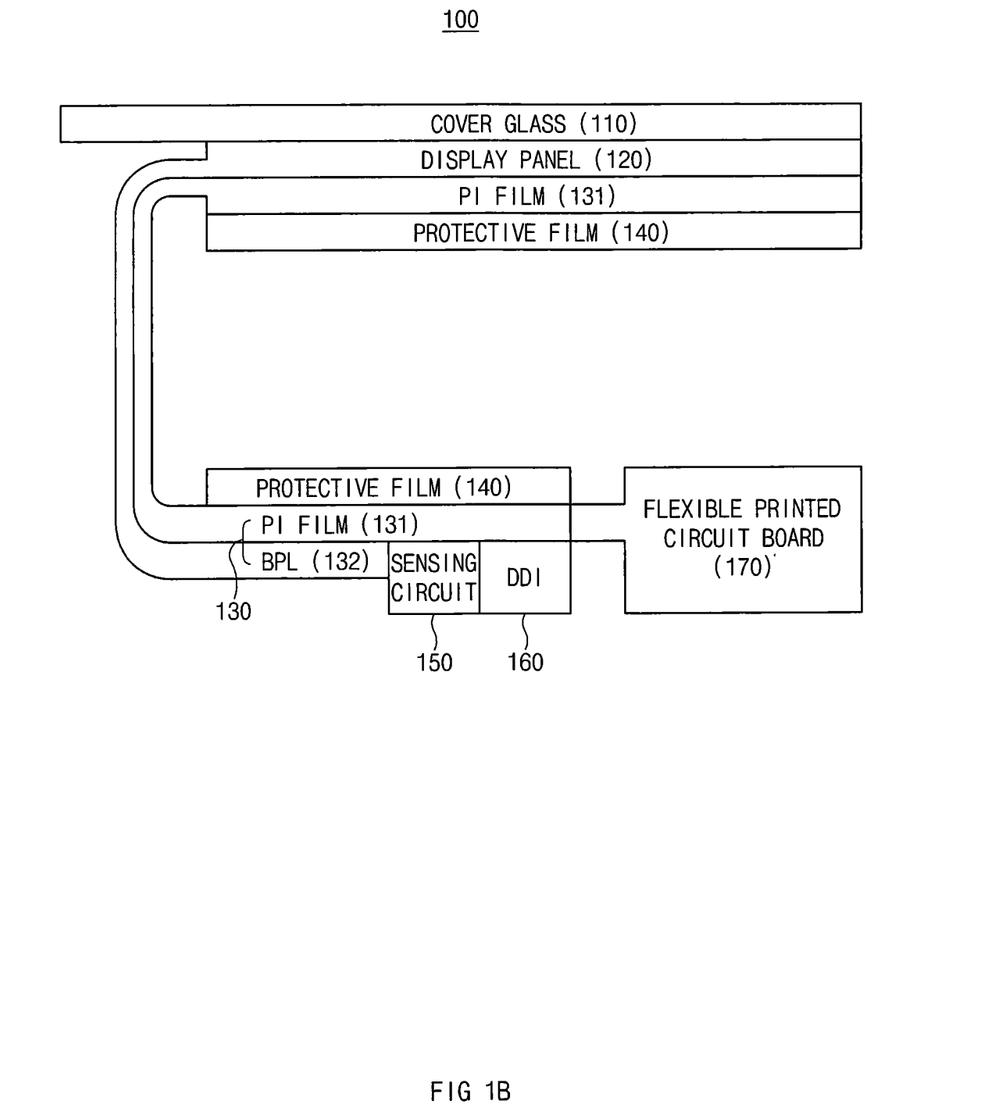
FIG. 1B illustrates a sectional view of the electronic device according to an embodiment.

FIG. 1B illustrates a sectional view of the electronic device 100 according to an embodiment. The sectional view illustrated in FIG. 1B is taken along line A-A' of FIG. 1A.

Referring to FIG. 1B, the electronic device 100 may include the cover glass 110, the display panel 120, a flexible substrate 130, a protective film (PF) 140, a sensing circuit 150, a display driver IC 160, and a flexible printed circuit board 170. Although not illustrated, the electronic device 100 may include a touch panel, a fingerprint sensor, a pressure sensor, a digitizer for obtaining a pen input, or the like.

The cover glass 110 may pass light generated by the display panel 120. Also, a user may touch the cover glass 110 with a part (e.g., a finger) of his/her body.

The display panel 120 may include, for example, gate lines, data lines, and light-emitting diodes (e.g., OLEDs) that emit light based on signals supplied from the gate lines and the data lines. Furthermore, the display panel 120 may include a substrate (e.g., a low-temperature poly silicon (LTPS) substrate) on which the light-emitting diodes are mounted and a thin film encapsulation (TFE) film for protecting the light-emitting diodes. In this disclosure, the data lines may be referred to as the signal lines or the control lines.

The flexible substrate 130 may include a polyimide (PI) film 131 and a bending protection layer (BPL) 132. The PI film 131 may be disposed below the display panel 120 and may include interconnection wiring for supplying electric power and/or signals to the display panel 120. According to an embodiment, the PI film 131 may be formed of a flexible material. The BPL 132 may be attached to a bent area of the PI film 131 to prevent the PI film 131 from being cracked (or broken).

According to an embodiment, one end of the flexible substrate 130 may be connected with the display panel 120. An opposite end of the flexible substrate 130 may be positioned on the opposite side to the cover glass 110 with respect to the display panel 120. As illustrated in FIG. 1B, the flexible substrate 130 may be mounted in a bent form in the electronic device 100.

According to an embodiment, the flexible substrate 130 may not be bent. For example, the flexible substrate 130 may extend from the display panel 120 such that the flexible substrate 130 is coplanar with the display panel 120. In this disclosure, the flexible substrate 130 may be referred to as the bending part.

The protective film 140 may be disposed below the PI film 131 and may support the PI film 131. Although not illustrated, the protective film 140 may be included in the flexible substrate 130.

The sensing circuit 150 may be disposed on a partial area of the flexible substrate 130 or the protective film 140. For example, the sensing circuit 150 may be disposed between the BPL 132 and the display driver IC 160. Although not illustrated, the sensing circuit 150 may be disposed on the BPL 132 or the protective film 140 and may be disposed between the display driver IC 160 and the flexible printed circuit board 170. The sensing circuit 150 may be a circuit for sensing a defect (e.g., cracks) in the display panel 120.

The display driver IC 160 may be electrically connected with the sensing circuit 150. The display driver IC 160 may sense, through the sensing circuit 150, whether the display panel 120 has a defect (e.g., cracks). For example, in the case where the display panel 120 has cracks, a different voltage may be applied to some sub-pixels, and thus the vertical line 10 may be displayed.

The display driver IC 160 may control the display panel 120. For example, the display driver IC 160 may output an image to the display panel 120.

The flexible printed circuit board 170 may be electrically connected with a partial area of the PI film 131. For example, the flexible printed circuit board 170 may be electrically connected with a conductive pattern (or interconnection wiring) formed on the PI film 131.

According to an embodiment, the electronic device 100 may not include some of the elements illustrated in FIG. 1B, or may additionally include other non-illustrated elements. Furthermore, the elements included in the electronic device 100 may be stacked in a different sequence from that illustrated in FIG. 1.

According to an embodiment, a connection between the display panel 120 and the display driver IC 160 may be implemented by a chip on plastic (COP) method or a chip on film (COF) method.

Figure 2:
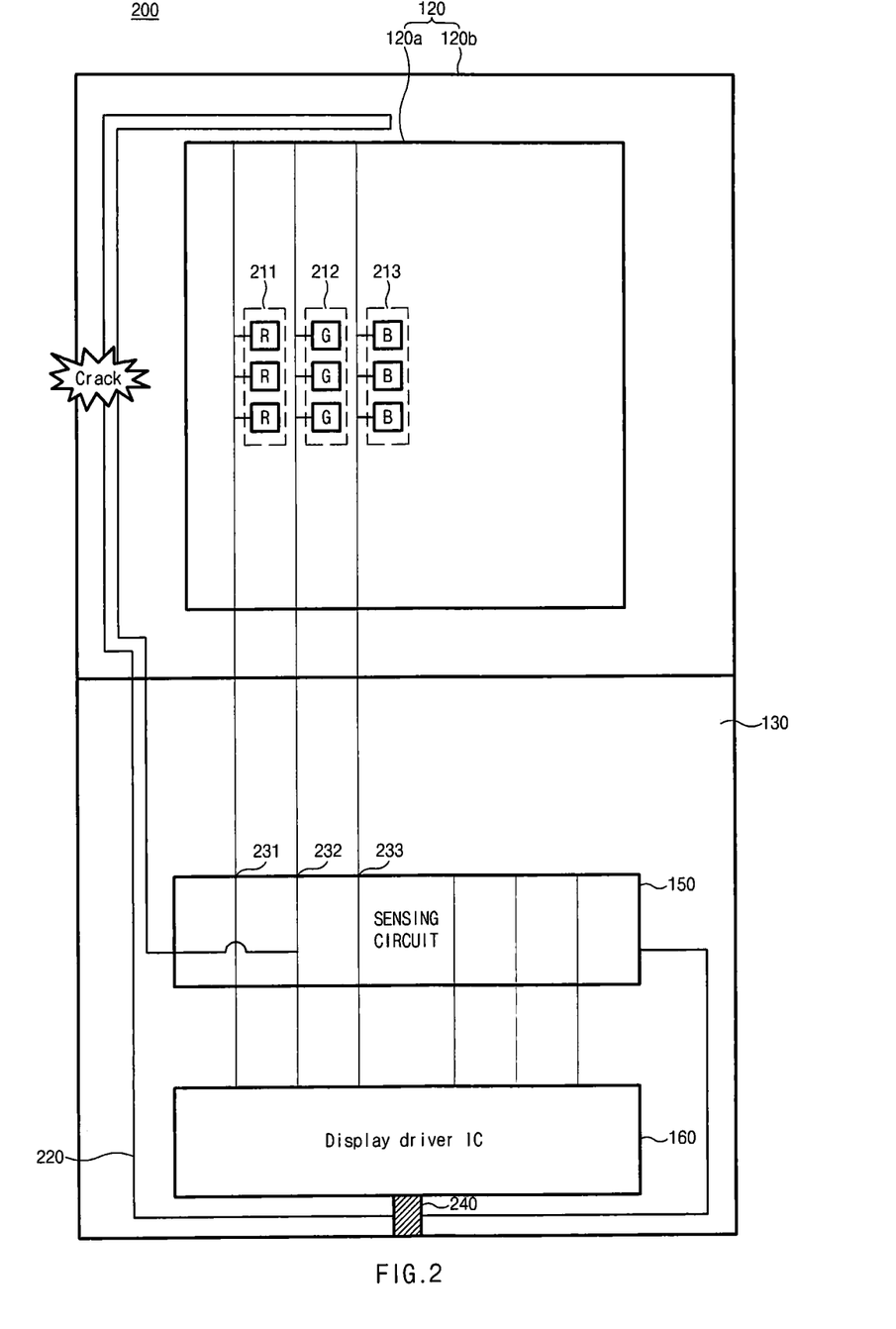
FIG. 2 illustrates a display according to an embodiment.

FIG. 2 illustrates a display according to an embodiment. A display 200 illustrated in FIG. 2 may be in a state in which the flexible substrate 130 illustrated in FIG. 1B is not bent. In this disclosure, the descriptions for FIGS. 1B and 2 may be identically applied to elements having the same reference numerals as the elements of the electronic device 100 illustrated in FIG. 1B and the elements of the display 200 illustrated in FIG. 2.

Referring to FIG. 2, the display 200 may include the display panel 120, the flexible substrate 130, the sensing circuit 150, the display driver IC 160, and a sensing line 220.

The display panel 120 may include an active area 120a and the inactive area 120b. The active area 120a may refer to an area in which sub-pixels are arranged on the display panel 120. The inactive area 120b may refer to the remaining area other than the active area 120a of the display panel 120. For example, the active area 120a may be positioned in the middle of the display panel 120, and the inactive area 120b may surround the active area 120a. In this disclosure, the inactive area 120b may be referred to as the bezel area or the black matrix (BM) area.

According to an embodiment, a partial area (e.g., a corner) of the inactive area 120b may have a curved shape. Since the partial area has a curved shape, the partial area may be narrower than the rest of the inactive area 120b. According to an embodiment of the present disclosure, cracks in the partial area may be sensed since a sensing line is disposed in the partial area as well.

According to an embodiment, a plurality of data lines 231, 232, and 233 may be arranged in the active area 120a. The data lines 231, 232, and 233 may be electrically connected with sub-pixels 211, 212, and 213 arranged in the active area 120a. Furthermore, each of the data lines 231, 232, and 233 may extend to the display driver IC 160 via the sensing circuit 150.

The display driver IC 160 may transmit a data signal to the sub-pixels 211, 212, and 213 through the data lines 231, 232, and 233. The sub-pixels 211, 212, and 213 may emit light, based on the received data signal. However, the display driver IC 160 may not transmit a data signal through the data lines 231, 232, and 233 when the electronic device 100 enters a sensing mode.

The sensing circuit 150 may be positioned between the display panel 120 and the display driver IC 160. For example, the sensing circuit 150 and the display driver IC 160 may be disposed on the flexible substrate 130, and the flexible substrate 130 may be connected with the display panel 120.

According to an embodiment, the flexible substrate 130 may be narrower than the display panel 120. For example, the flexible substrate 130 may have a small width in an area (e.g., a bending area) connected with the display panel 120.

The sensing circuit 150 may be connected with a power line 240 and may transmit DC voltage transmitted from the power line 240 to the sub-pixels 211, 212, and 213 through the data lines 231, 232, and 233. In this disclosure, the power line 240 may refer to a line for supplying DC voltage to the display driver IC 160.

The sensing line 220 may be connected with the power line 240. Also, the sensing line 220 may be connected with any one of the data lines 231, 232, and 233 through the inactive area 120*b*. For example, the sensing line 220 may be connected with the data line 232 that is connected with the green sub-pixels 212. In this case, DC voltage applied through the power line 240 may be applied to the green sub-pixels 212. In another example, the sensing line 220 may be connected with the data line 231 that is connected with the red sub-pixels 211 or the data line 233 that is connected with the blue sub-pixels 213.

According to an embodiment, the sub-pixels 212 connected with the sensing line 220 may emit light with different brightness than the other sub-pixels 211 and 213 when the inactive area 120*b* has cracks. For example, the resistance of the sensing line 220 may increase when the inactive area 120*b* has cracks. Since the resistance of the sensing line 220 increases, DC voltage applied to the sub-pixels 212 connected to the corresponding data line 232 may be lower than that applied to the sub-pixels 211 and 213 connected to the other data lines 231 and 233. Accordingly, the sub-pixels 212 connected to the corresponding data line 232 may emit brighter (or darker) light than the sub-pixels 211 and 213 connected to the other data lines 231 and 233. Since the sub-pixels 212 connected with the sensing line 220 emit brighter (or darker) light than the other sub-pixels 211 and 213, a user may determine that the inactive area 120*b* has cracks.

Figure 3:
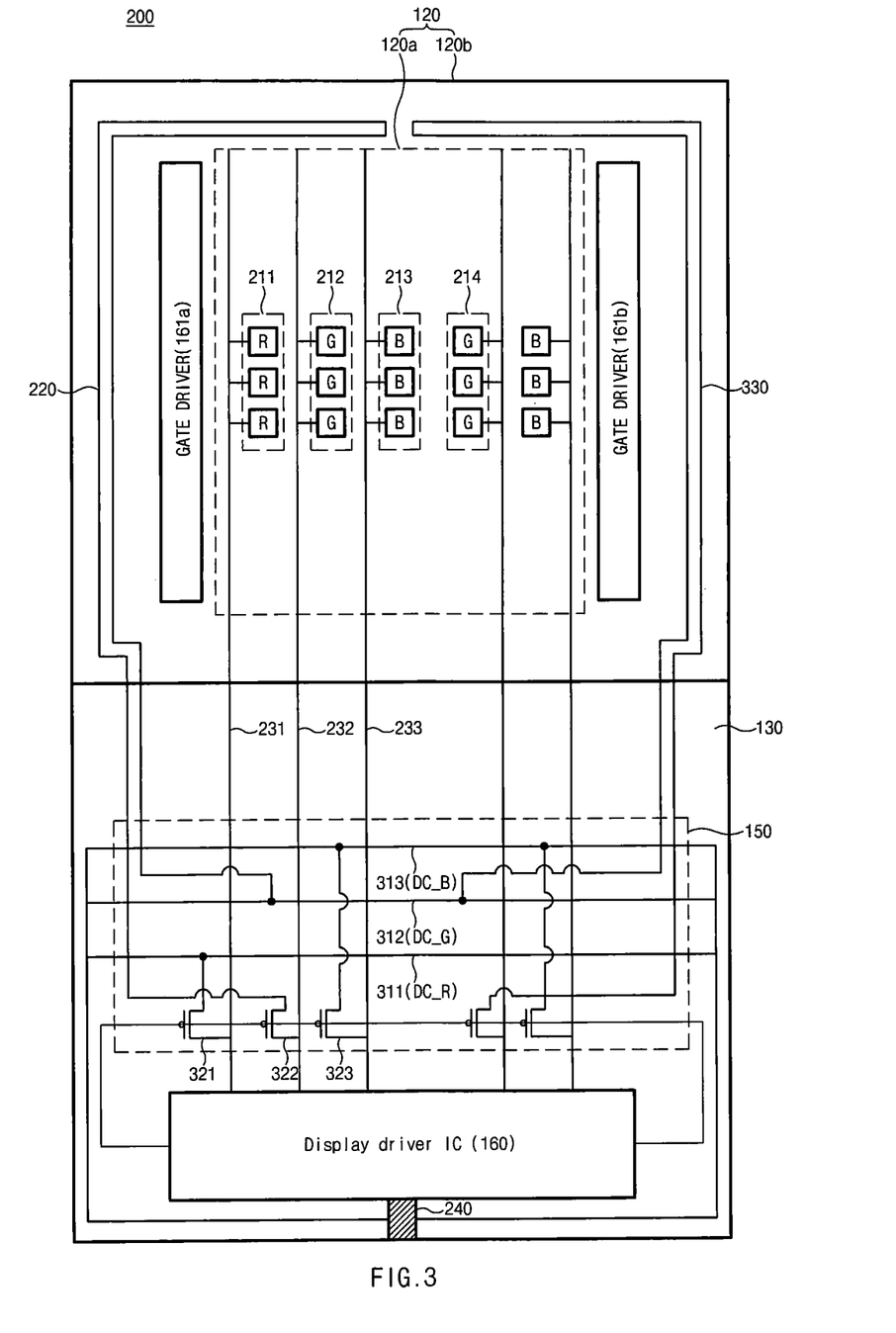
FIG. 3 illustrates a display according to another embodiment.

FIG. 3 illustrates a display according to another embodiment. FIG. 3 illustrates a detailed circuit diagram of the display 200 illustrated in FIG. 2.

Referring to FIG. 3, the sensing circuit 150 may include first to third lines 311 to 313 and a plurality of transistors 321 to 323 for supplying DC voltage to the sub-pixels 211 to 214. The first to third lines 311 to 313 may be connected with the power line 240. DC voltage applied through the power line 240 may be, for example, about 7 V.

Source terminals of the transistors 321 to 323 may be connected with any one of the first to third lines 311 to 313. Drain terminals of the transistors 321 to 323 may be connected with any one of the data lines 231 to 233. Accordingly, the transistors 321 to 323 may transmit DC voltage from the first to third lines 311 to 313 to the data lines 231 to 233. For example, the transistor 321 may transmit DC voltage applied to the first line 311 to the data line 231.

Gate terminals of the transistors 321 to 323 may be connected with the display driver IC 160. Since the gate terminals of the transistors 321 to 323 and the display driver IC 160 are connected together, the display driver IC 160 may turn on or off the transistors 321 to 323. For example, the display driver IC 160 may apply a square wave to the gate terminals of the transistors 321 to 323. The transistors 321 to 323 may be turned off when a high signal of the square wave is applied to the gate terminals, and may be turned on when a low signal of the square wave is applied to the gate terminals. In this disclosure, the high signal may refer to a high-voltage signal of the square wave, and the low signal may refer to a low-voltage signal of the square wave.

When the transistors 321 to 323 are turned on, DC voltage may be transmitted to the sub-pixels 211 to 213 since the first to third lines 311 to 313 and the data lines 231 to 233 are interconnected. In this case, the sub-pixels 211 to 213 may be implemented in black. In this disclosure, the transistors 321 to 323 may be referred to as p-type MOSFET.

The sensing line 220 may extend from the second line 312 to the transistor 322 via the inactive area 120*b*. Since the second line 312 and the transistor 322 are connected through the sensing line 220, DC voltage applied to the second line 312 may be transmitted to the pixels 212 through the sensing line 220, the transistor 322, and the data line 232. According to another embodiment, the sensing line 220 may extend from the first line 311 to the transistor 321 via the inactive area 120*b*, or may extend from the third line 313 to the transistor 323 via the inactive area 120*b*.

The display driver IC 160 may transmit a data signal through the data lines 231, 232, and 233. The sub-pixels 211, 212, and 213 having received the data signal may emit light, based on the magnitude of the data signal. However, the display driver IC 160 may not transmit a data signal through the data lines 231, 232, and 233 when the electronic device 100 enters a sensing mode.

Gate drivers 161*a* and 161*b* may turn on the sub-pixels 211 to 213. When a data signal or DC voltage is applied to the sub-pixels 211 to 213 in a turned-on state, the sub-pixels 211 to 213 may emit light with brightness corresponding to the data signal or the DC voltage. For example, when DC voltage is applied to the sub-pixels 211 to 213 in a turned-on state, the sub-pixels 211 to 213 may be implemented in black.

When the electronic device 100 enters a sensing mode, the display driver IC 160 may sense whether the inactive area 120*b* has cracks. For example, the display driver IC 160 may not transmit a data signal through the data lines 231, 232, and 233 when the electronic device 100 enters the sensing mode. The display driver IC 160 may repeatedly perform an operation of turning on or off the transistors 321 to 323 in the state in which a data signal is not transmitted. The sub-pixels 211 to 213 may be implemented in black when the transistors 321 to 323 are turned on.

At this time, the resistance of the sensing line 220 may increase if the inactive area 120*b* has cracks. Since the resistance of the sensing line 220 increases, DC voltage applied to the sub-pixels 212 connected to the corresponding data line 232 may be lower than that applied to the sub-pixels 211 and 213 connected to the other data lines 231 and 233. Accordingly, the sub-pixels 212 connected to the corresponding data line 232 may emit brighter (or darker) light than the sub-pixels 211 and 213 connected to the other data lines 231 and 233. Since the sub-pixels 212 are connected with the sensing line 220, the sub-pixels 212 may emit green light while the other sub-pixels 211 and 213 are implemented in black.

According to an embodiment, the description of the sensing line 220 may also be applied to a sensing line 330. For example, the resistance of the sensing line 330 may increase when the inactive area 120b in which the sensing line 330 is disposed has cracks. Accordingly, the sub-pixels 214 connected with the sensing line 330 may emit brighter (or darker) light than the other sub-pixels 211 to 213.

Figure 4:
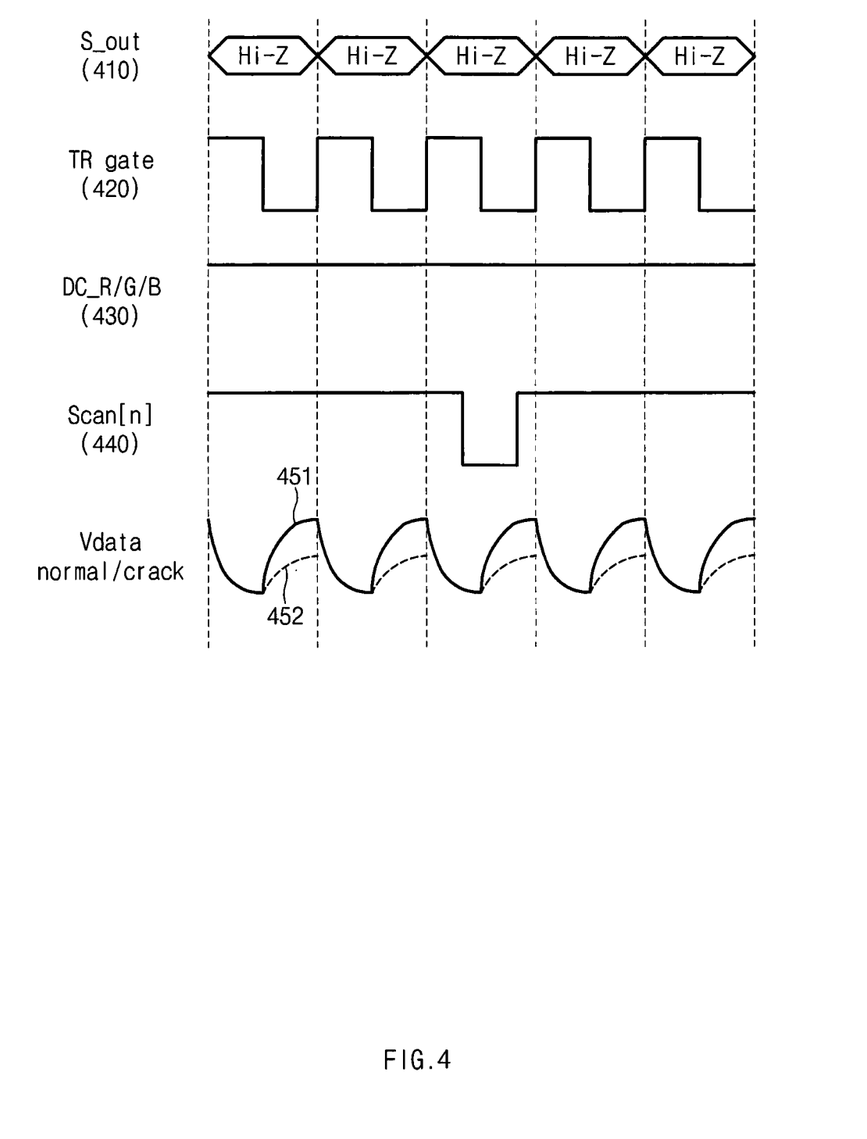
FIG. 4 illustrates display operation timing according to an embodiment.

FIG. 4 illustrates display operation timing according to an embodiment. FIG. 4 illustrates operation timings of elements included in the display 200 illustrated in FIG. 3.

Referring to FIG. 4, a graph 410 depicts a data signal output from the display driver IC 160, a graph 420 depicts a signal input to the gate terminals of the transistors 321 to 323, a graph 430 depicts a signal input to the source terminals of the transistors 321 to 323, a graph 440 depicts a gate signal applied to the data line 232, a graph 451 depicts voltage applied to the sub-pixels 212 when the inactive area 120b has no crack, and a graph 452 depicts voltage applied to the sub-pixels 212 when the inactive area 120b has cracks.

Referring to the graph 410, the display driver IC 160 may not output a data signal when the electronic device 100 enters a sensing mode. The graph 410 may mean a state in which the display driver IC 160 does not output a data signal.

Referring to the graph 420, a square wave may be input to the gate terminals of the transistors 321 to 323 in the state in which the display driver IC 160 does not output a data signal. Accordingly, the transistors 321 to 323 may be repeatedly turned on and off.

When the transistors 321 to 323 are turned off, DC voltage may not be transmitted to the sub-pixels 212. Accordingly, voltage applied to the sub-pixels 212 may gradually decrease, as illustrated in the graphs 451 and 452. In contrast, when the transistors 321 to 323 are turned on, DC voltage may be transmitted to the sub-pixels 212. Accordingly, voltage applied to the sub-pixels 212 may gradually increase, as illustrated in the graphs 451 and 452.

The graph 451 and the graph 452 show that the resistance of the sensing line 220 increases when the inactive area 120b has cracks. In this case, as compared with when the inactive area 120b has no crack, an increment in voltage may decrease even though DC voltage is applied. Since a lower voltage is applied when the inactive area 120b has cracks than when the inactive area 120b has no crack, the sub-pixels 212 connected with the sensing line 220 may emit brighter (or darker) light than the other sub-pixels 211 and 213.

Figure 5:
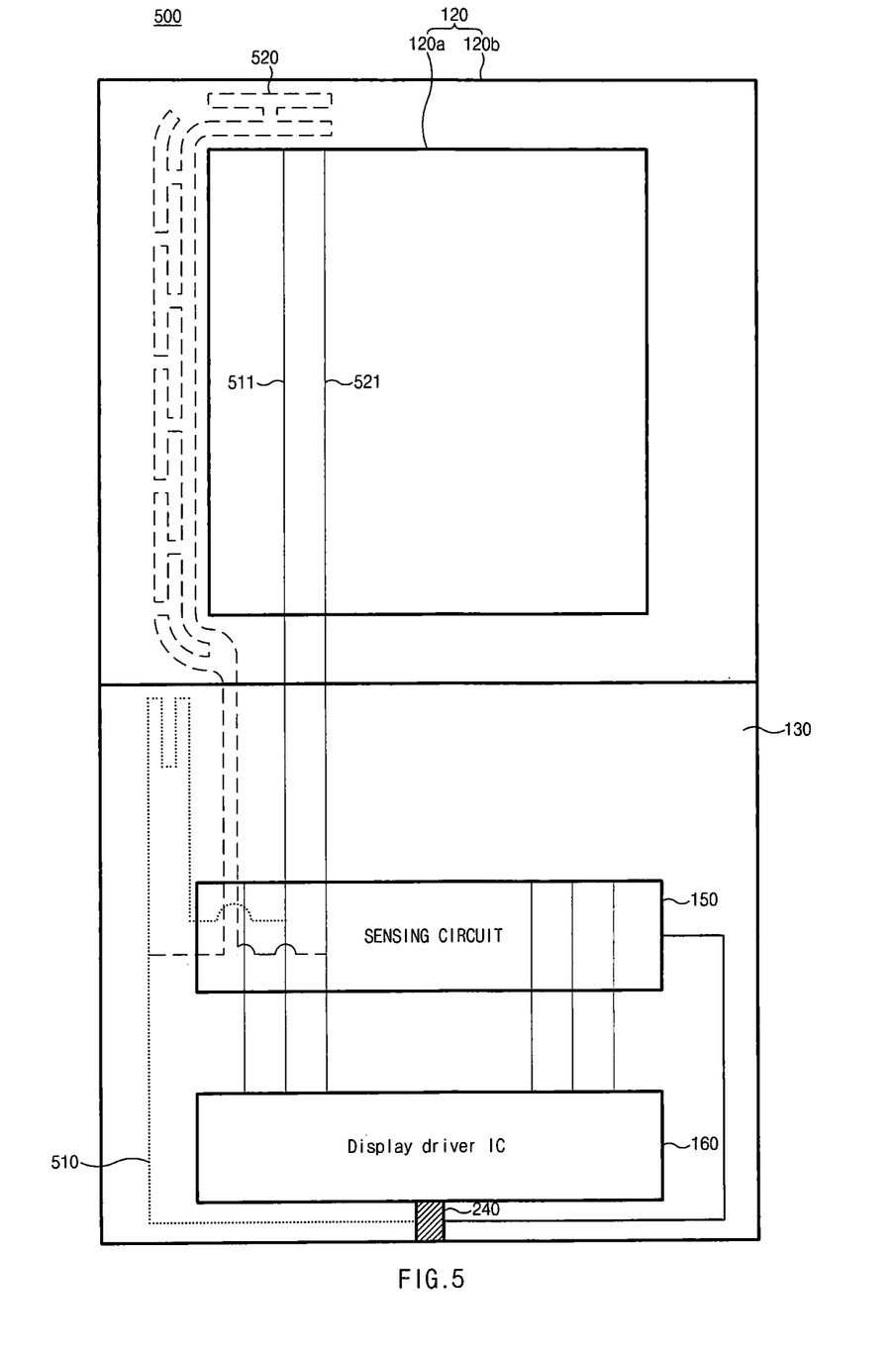
FIG. 5 illustrates a top view of a display according to another embodiment.
Figure 6:
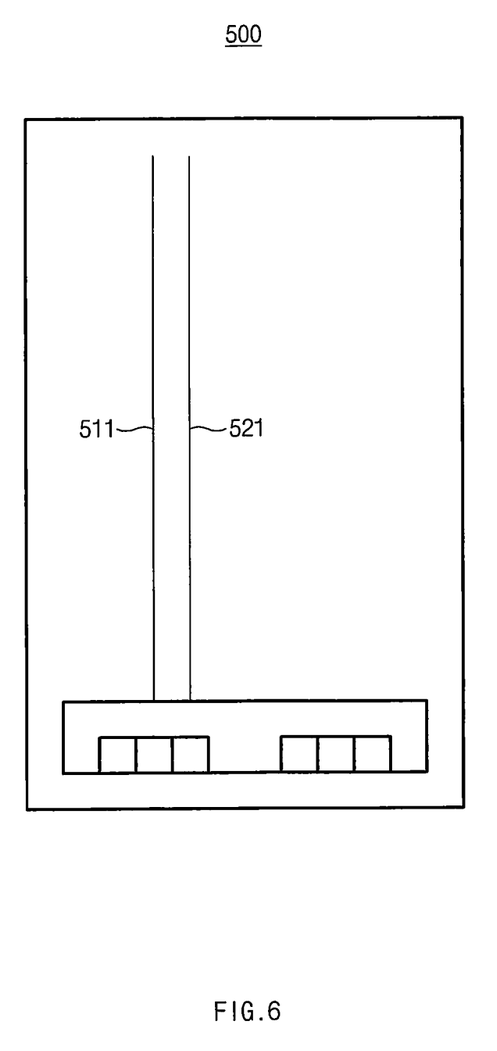
FIG. 6 illustrates a display on which a plurality of vertical lines are displayed, according to an embodiment.

FIG. 5 illustrates a top view of a display according to another embodiment. FIG. 6 illustrates a display on which a plurality of vertical lines are displayed, according to an embodiment. FIG. 6 illustrates a simplified view of a display 500 illustrated in FIG. 5.

Referring to FIG. 5, the display 500 may include a first sensing line 510 and a second sensing line 520.

The first sensing line 510 may extend from the power line 240 to the flexible substrate 130. Also, the first sensing line 510 may be connected with a data line 511 through the sensing circuit 150. Since at least a portion of the first sensing line 510 is disposed on the flexible substrate 130, the resistance of the first sensing line 510 may increase when the flexible substrate 130 has cracks. Accordingly, sub-pixels connected to the corresponding data line 511 may emit brighter (or darker) light than other sub-pixels.

The second sensing line 520 may extend from the power line 240 to the inactive area 120b. Also, the second sensing line 520 may be connected with a data line 521 through the sensing circuit 150. Since at least a portion of the second sensing line 520 is disposed in the inactive area 120b, the resistance of the second sensing line 520 may increase when the inactive area 120b has cracks. Accordingly, sub-pixels connected to the corresponding data line 521 may emit brighter (or darker) light than other sub-pixels.

According to an embodiment of the present disclosure, a user may determine the location of cracks since the sensing lines 510 and 520 are disposed on the flexible substrate 130 and the inactive area 120b, as described above. For example, referring to FIG. 6, when a vertical line 511 is displayed, a user may determine that the flexible substrate 130 has cracks. When a vertical line 521 is displayed, the user may determine that the inactive area 120 has cracks. Alternatively, when the vertical lines 511 and 512 are all displayed, the user may determine that both the flexible substrate 130 and the inactive area 120b have cracks.

According to an embodiment, as illustrated in FIG. 5, the second sensing line 520 may be arranged in a specified shape in the inactive area 120b. Compared with the sensing line 220 illustrated in FIG. 2, the second sensing line 520 may occupy much space in the inactive area 120b. Accordingly, the display 500 may easily sense cracks, compared with the display 200.

An electronic device according to an embodiment of the present disclosure may include a cover glass, a display panel exposed through the cover glass, a flexible substrate extending from a periphery of the display panel and bent and positioned on a rear surface of the display panel, a display driver integrated circuit (DDI) disposed on the flexible substrate, a sensing circuit disposed on the flexible substrate and electrically connected with the display driver integrated circuit, signal lines that transmit a signal to sub-pixels arranged on the display panel, and a sensing line passing through a peripheral portion of the display panel and the flexible substrate and electrically connected with at least some of the signal lines through the sensing circuit. The display driver integrated circuit may be configured to display an electrical signal received through the sensing line on the display panel through some of the signal lines to allow identification of a defect in a display.

According to an embodiment of the present disclosure, the display panel may include an active area in which the signal lines and the sub-pixels are arranged and an inactive area that surrounds a periphery of the active area.

According to an embodiment of the present disclosure, the display driver integrated circuit may transmit a sensing signal to the sensing circuit in response to a user input for sensing the defect.

According to an embodiment of the present disclosure, among the sub-pixels, at least one sub-pixel connected with the sensing line may emit light S with different brightness than the other sub-pixels not being connected with the sensing line when the inactive area has cracks.

According to an embodiment of the present disclosure, at least a portion of the sensing line may be disposed in the inactive area.

According to an embodiment of the present disclosure, the sensing circuit may include one or more switches electrically connected with the display driver integrated circuit, and the display driver integrated circuit may control voltage supplied to the sub-pixels by controlling on/off of the switches.

According to an embodiment of the present disclosure, the electronic device may further include another sensing line for detecting cracks in the flexible substrate, and the another sensing line may be connected with at least one signal line other than the signal lines connected with the sensing line.

According to an embodiment of the present disclosure, among the sub-pixels, at least one sub-pixel connected with the another sensing line may emit light with different brightness than the other sub-pixels not being connected with the another sensing line when the flexible substrate has cracks.

According to an embodiment of the present disclosure, the flexible substrate may extend from the periphery of the display panel to one point on a plane located on the opposite side to the cover glass with respect to the display panel.

A display module according to an embodiment of the present disclosure may include a display panel including an active area in which one or more pixels are arranged and an inactive area in which a sensing line connected with at least some of the pixels is arranged, a flexible substrate connected with the display panel and on which at least a portion of the sensing line is formed, and a sensing circuit disposed on at least a partial area of the flexible substrate and sensing cracks in the display panel by using at least a portion of the sensing line. At least a partial area of the flexible substrate may be bent to face a rear surface of the display panel.

According to an embodiment of the present disclosure, the display module may further include control lines for controlling the one or more pixels, and the sensing line may be electrically connected with at least one of the control lines.

According to an embodiment of the present disclosure, the display module may further include another sensing line, and the another sensing line may be electrically connected with at least one control line other than the control line electrically connected with the sensing line.

According to an embodiment of the present disclosure, the another sensing line may be disposed on at least a partial area of the flexible substrate.

According to an embodiment of the present disclosure, the inactive area may be formed to surround at least a portion of the active area.

According to an embodiment of the present disclosure, wherein among the pixels, at least one pixel connected with the sensing line emits light with different brightness than the other pixels not being connected with the sensing line when an electrical characteristic of the sensing line changes.

According to an embodiment of the present disclosure, the sensing line may include a first sensing line and a second sensing line. The first sensing line may be disposed in a first section of the inactive area that is formed in a first direction from the active area, and the second sensing line may be disposed in a second section of the inactive area that is formed in a second direction from the active area.

According to an embodiment of the present disclosure, the display module may further include a display driver integrated circuit (DDI), and the sensing line may have one end connected with at least some of the one or more pixels through at least one switch and an opposite end connected with the display driver integrated circuit.

According to an embodiment of the present disclosure, the flexible substrate may extend from the inactive area to one point on a plane that faces the rear surface of the display panel.

According to an embodiment of the present disclosure, the sensing circuit may sense cracks in a section of the inactive area where a signal line is disposed.

According to an embodiment of the present disclosure, at least one other partial area of the flexible substrate may be bent such that the at least a partial area on which the sensing circuit is disposed faces the rear surface of the display panel.

Figure 7:
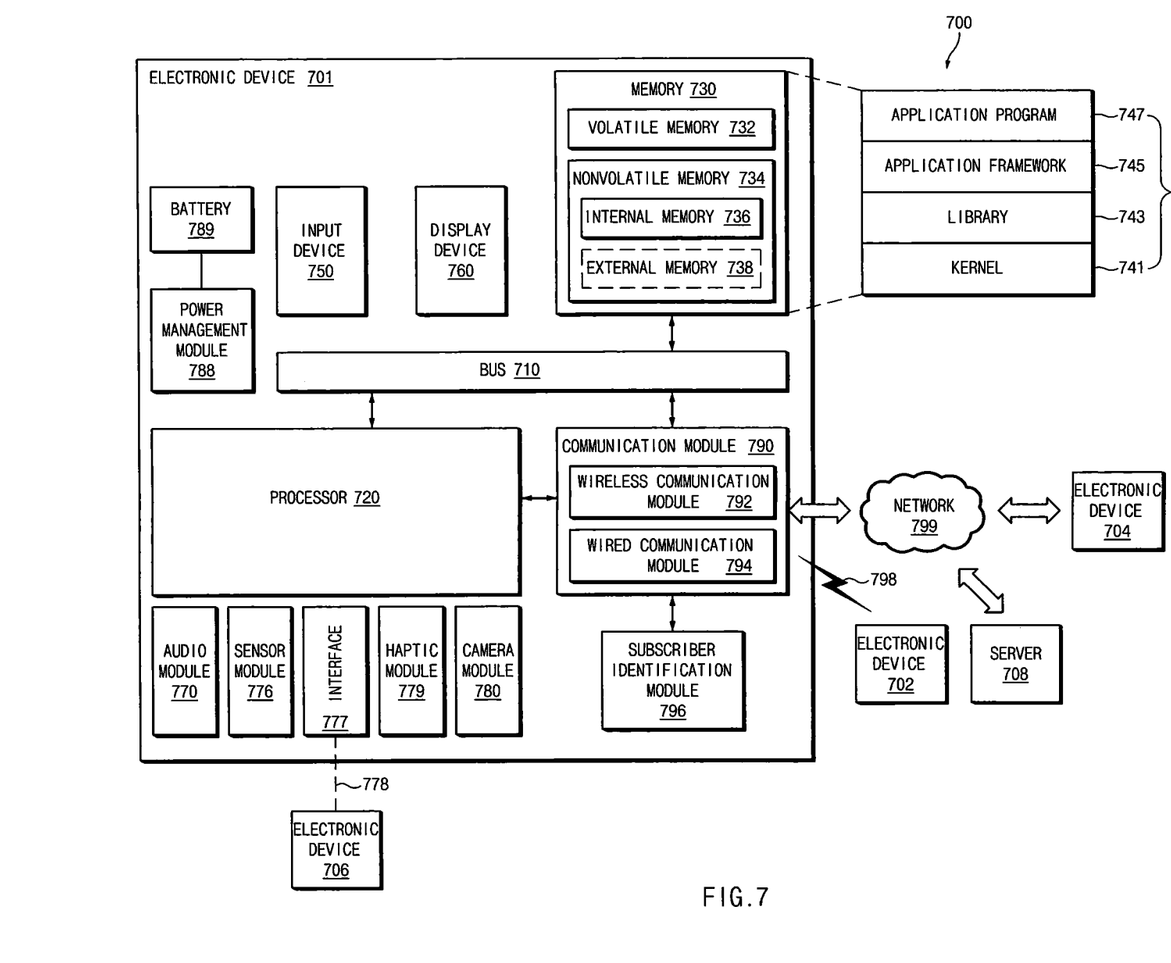
FIG. 7 illustrates an electronic device in a network environment according to various embodiments.

FIG. 7 illustrates a block diagram of an electronic device 701 (e.g., the electronic device 100 in FIG. 1A) in a network environment 700, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 7, under the network environment 700, the electronic device 701 (e.g., the electronic device 100) may communicate with an electronic device 702 through local wireless communication 798 or may communication with an electronic device 704 or a server 708 through a network 799. According to an embodiment, the electronic device 701 may communicate with the electronic device 704 through the server 708.

According to an embodiment, the electronic device 701 may include a bus 710, a processor 720, a memory 730, an input device 750 (e.g., a micro-phone or a mouse), a display device 760, an audio module 770, a sensor module 776, an interface 777, a haptic module 779, a camera module 780, a power management module 788, a battery 789, a communication module 790, and a subscriber identification module 796. According to an embodiment, the electronic device 701 may not include at least one (e.g., the display device 760 or the camera module 780) of the above-described elements or may further include other element(s).

The bus 710 may interconnect the above-described elements 720 to 790 and may include a circuit for conveying signals (e.g., a control message or data) between the above-described elements.

The processor 720 may include one or more of a central processing unit (CPU), an application processor (AP), a graphic processing unit (GPU), an image signal processor (ISP) of a camera or a communication processor (CP). According to an embodiment, the processor 720 may be implemented with a system on chip (SoC) or a system in package (SiP). For example, the processor 720 may drive an operating system (OS) or an application to control at least one of another element (e.g., hardware or software element) connected to the processor 720 and may process and compute various data. The processor 720 may load a command or data, which is received from at least one of other elements (e.g., the communication module 790), into a volatile memory 732 to process the command or data and may store the result data into a nonvolatile memory 734.

The memory 730 may include, for example, the volatile memory 732 or the nonvolatile memory 734. The volatile memory 732 may include, for example, a random access memory (RAM) (e.g., a dynamic RAM (DRAM), a static RAM (SRAM), or a synchronous DRAM (SDRAM)). The nonvolatile memory 734 may include, for example, a programmable read-only memory (PROM), a one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 734 may be configured in the form of an internal memory 736 or the form of an external memory 738 which is available through connection only if necessary, according to the connection with the electronic device 701. The external memory 738 may further include a flash drive such as compact flash (CF), secure digital (SD), micro secure digital (Micro-SD), mini secure digital (Mini-SD), extreme digital (xD), a multimedia card (MMC), or a memory stick. The external memory 738 may be operatively or physically connected with the electronic device 701 in a wired manner (e.g., a cable or a universal serial bus (USB)) or a wireless (e.g., Bluetooth) manner.

For example, the memory 730 may store, for example, at least one different software element, such as a command or data associated with the program 740, of the electronic device 701. The program 740 may include, for example, a kernel 741, a library 743, an application framework 745 or an application program (interchangeably, "application") 747.

The input device 750 may include a microphone, a mouse, or a keyboard. According to an embodiment, the keyboard may include a keyboard physically connected or a virtual keyboard displayed through the display 760.

The display 760 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 701.

The audio module 770 may convert, for example, from a sound into an electrical signal or from an electrical signal into the sound. According to an embodiment, the audio module 770 may acquire sound through the input device 750 (e.g., a microphone) or may output sound through an output device (not illustrated) (e.g., a speaker or a receiver) included in the electronic device 701, an external electronic device (e.g., the electronic device 702 (e.g., a wireless speaker or a wireless headphone)) or an electronic device 706 (e.g., a wired speaker or a wired headphone) connected with the electronic device 701.

The sensor module 776 may measure or detect, for example, an internal operating state (e.g., power or temperature) of the electronic device 701 or an external environment state (e.g., an altitude, a humidity, or brightness) to generate an electrical signal or a data value corresponding to the information of the measured state or the detected state. The sensor module 776 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 776 may further include a control circuit for controlling at least one or more sensors included therein. According to an embodiment, the sensor module 776 may be controlled by using the processor 720 or a processor (e.g., a sensor hub) separate from the processor 720. In the case that the separate processor (e.g., a sensor hub) is used, while the processor 720 is in a sleep state, the separate processor may operate without awakening the processor 720 to control at least a portion of the operation or the state of the sensor module 776.

According to an embodiment, the interface 777 may include a high definition multimedia interface (HDMI), a universal serial bus (USB), an optical interface, a recommended standard 232 (RS-232), a D-subminiature (D-sub), a mobile high-definition link (MHL) interface, a SD card/MMC(multi-media card) interface, or an audio interface. A connector 778 may physically connect the electronic device 701 and the electronic device 706. According to an embodiment, the connector 778 may include, for example, an USB connector, an SD card/MMC connector, or an audio connector (e.g., a headphone connector).

The haptic module 779 may convert an electrical signal into mechanical stimulation (e.g., vibration or motion) or into electrical stimulation. For example, the haptic module 779 may apply tactile or kinesthetic stimulation to a user. The haptic module 779 may include, for example, a motor, a piezoelectric element, or an electric stimulator.

The camera module 780 may capture, for example, a still image and a moving picture. According to an embodiment, the camera module 780 may include at least one lens (e.g., a wide-angle lens and a telephoto lens, or a front lens and a rear lens), an image sensor, an image signal processor, or a flash (e.g., a light emitting diode or a xenon lamp).

The power management module 788, which is to manage the power of the electronic device 701, may constitute at least a portion of a power management integrated circuit (PMIC).

The battery 789 may include a primary cell, a secondary cell, or a fuel cell and may be recharged by an external power source to supply power at least one element of the electronic device 701.

The communication module 790 may establish a communication channel between the electronic device 701 and an external device (e.g., the first external electronic device 702, the second external electronic device 704, or the server 708). The communication module 790 may support wired communication or wireless communication through the established communication channel. According to an embodiment, the communication module 790 may include a wireless communication module 792 or a wired communication module 794. The communication module 790 may communicate with the external device through a first network 798 (e.g. a wireless local area network such as Bluetooth or infrared data association (IrDA)) or a second network 799 (e.g., a wireless wide area network such as a cellular network) through a relevant module among the wireless communication module 792 or the wired communication module 794.

The wireless communication module 792 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 792 supports cellar communication, the wireless communication module 792 may, for example, identify or authenticate the electronic device 701 within a communication network using the subscriber identification module (e.g., a SIM card) 796. According to an embodiment, the wireless communication module 792 may include a communication processor (CP) separate from the processor 720 (e.g., an application processor (AP)). In this case, the communication processor may perform at least a portion of functions associated with at least one of elements 710 to 796 of the electronic device 701 in substitute for the processor 720 when the processor 720 is in an inactive (sleep) state, and together with the processor 720 when the processor 720 is in an active state. According to an embodiment, the wireless communication module 792 may include a plurality of communication modules, each supporting only a relevant communication scheme among cellular communication, local wireless communication, or a GNSS communication.

The wired communication module 794 may include, for example, include a local area network (LAN) service, a power line communication, or a plain old telephone service (POTS).

For example, the first network 798 may employ, for example, Wi-Fi direct or Bluetooth for transmitting or receiving commands or data through wireless direct connection between the electronic device 701 and the first external electronic device 702. The second network 799 may include a telecommunication network (e.g., a computer network such as a LAN or a WAN, the Internet or a telephone network) for transmitting or receiving commands or data between the electronic device 701 and the second electronic device 704.

According to various embodiments, the commands or the data may be transmitted or received between the electronic device 701 and the second external electronic device 704 through the server 708 connected with the second network 799. Each of the first and second external electronic devices 702 and 704 may be a device of which the type is different from or the same as that of the electronic device 701. According to various embodiments, all or a part of operations that the electronic device 701 will perform may be executed by another or a plurality of electronic devices (e.g., the electronic devices 702 and 704 or the server 708). According to an embodiment, in the case that the electronic device 701 executes any function or service automatically or in response to a request, the electronic device 701 may not perform the function or the service internally, but may alternatively or additionally transmit requests for at least a part of a function associated with the electronic device 701 to any other device (e.g., the electronic device 702 or 704 or the server 708). The other electronic device (e.g., the electronic device 702 or 704 or the server 708) may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 730).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 730) in the form of a program module. The instruction, when executed by a processor (e.g., a processor 720), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a cover glass having a surface configured to receive a touch input;
a display panel exposed through the cover glass;
a flexible substrate including a first portion connected with and bent from the display panel, and a second portion extending from the first portion and disposed below a rear surface of the display panel;
a display driver integrated circuit (DDI) disposed on the second portion of the flexible substrate;
a sensing circuit disposed on the second portion of the flexible substrate, wherein the sensing circuit is electrically connected with the DDI and disposed between the first portion of the flexible substrate and the DDI outside of the DDI and in a non-overlapping manner with the DDI from a perspective of the surface of the cover glass, such that the sensing circuit is closer to the display panel than the DDI;
signal lines electrically connected with the sensing circuit and configured to transmit a signal to sub-pixels arranged on the display panel; and
a first sensing line passing through a peripheral portion of the display panel and the first, bent portion of the flexible substrate, and electrically connected with at least some of the signal lines via the sensing circuit,
wherein the display panel is disposed on the first portion of the flexible substrate,
wherein the DDI is configured to control display of an image based on electrical signal received through the first sensing line for identification of a defect in the peripheral portion of the display panel, and
wherein the sensing circuit is configured to detect at least one defect in one of the display panel or the flexible substrate based on a color or brightness of the sub-pixels transmitted from the signal lines that are electrically connected with the first sensing line as a resistance of the first sensing line is changed.

2. The electronic device of claim 1, wherein the display panel includes an active area in which the signal lines and the sub-pixels are arranged and an inactive area that surrounds a periphery of the active area.

3. The electronic device of claim 2, wherein the DDI transmits a sensing signal to the sensing circuit in response to a user input for sensing the defect.

4. The electronic device of claim 2, wherein among the sub-pixels, at least one sub-pixel connected with the first sensing line emits light with different brightness than the other sub-pixels not being connected with the first sensing line when the defect in the peripheral portion of the display panel occurs.

5. The electronic device of claim 2, wherein at least a portion of the first sensing line is disposed in the inactive area.

6. The electronic device of claim 2, wherein the sensing circuit includes one or more switches electrically connected with the DDI, and
wherein the DDI controls voltage supplied to the sub-pixels by controlling on/off of the switches.

7. The electronic device of claim 2, further comprising:
a second sensing line configured to detect a defect in the flexible substrate,
wherein the second sensing line is connected with at least one signal line other than the signal lines connected with the first sensing line for identification of a defect in the flexible substrate, and
wherein the second sensing line is disposed on the flexible substrate without extending inward to the peripheral portion of the active area.

8. The electronic device of claim 7, wherein among the sub-pixels, at least one sub-pixel connected with the second sensing line emits light with different brightness than the other sub-pixels not being connected with the second sensing line when the defect in the flexible substrate occurs.

9. The electronic device of claim 1, wherein the flexible substrate extends from the periphery of the display panel to one point on a plane located on the opposite side to the cover glass with respect to the display panel.

10. The electronic device of claim 1, wherein the flexible substrate has a smaller width than a width of the display panel in an area in which the flexible substrate is bent.

11. A display module comprising:
- a display panel having a surface configured to receive a touch input and including an active area in which one or more pixels are arranged and an inactive area in which a sensing line connected with at least some of the pixels is arranged;
- a flexible substrate connected with the display panel, wherein at least a portion of the sensing line is formed on the flexible substrate;
- a display driver integrated circuit (DDI) disposed on a first partial area of the flexible substrate;
- a sensing circuit electrically connected with the DDI and disposed outside of the DDI and in a non-overlapping manner with the DDI from a perspective of the surface of the display panel, and disposed on a second partial area of the flexible substrate that is closer to the display panel than the DDI, wherein the sensing circuit is configured to sense cracks in the display panel by using at least a portion of the sensing line; and
- signal lines electrically connected with the sensing circuit and configured to transmit a signal to the pixels arranged on the display panel,
- wherein at least one of the first partial area or the second partial area of the flexible substrate is bent to face a rear surface of the display panel, and
- wherein the sensing circuit is configured to detect at least one defect in one of the display panel or the flexible substrate based on a color or brightness of the pixels transmitted from the signal lines that are electrically connected with the sensing line as a resistance of the sensing line is changed.

12. The display module of claim 11, further comprising: control lines configured to control the one or more pixels, wherein the sensing line is electrically connected with at least one of the control lines.

13. The display module of claim 12, further comprising: another sensing line,
wherein the another sensing line is electrically connected with at least one control line other than the control line electrically connected with the sensing line.

14. The display module of claim 13, wherein the another sensing line is disposed on at least one of the first partial area or the second partial area of the flexible substrate.

15. The display module of claim 11, wherein the inactive area is formed to surround at least a portion of the active area.

16. The display module of claim 11, wherein among the pixels, at least one pixel connected with the sensing line emits light with different brightness than the other pixels not being connected with the sensing line when an electrical characteristic of the sensing line changes.

* * * * *